(12) United States Patent
Schwager et al.

(10) Patent No.: US 12,339,713 B2
(45) Date of Patent: Jun. 24, 2025

(54) PORTABLE INFORMATION HANDLING SYSTEM HINGE

(71) Applicant: Dell Products L.P., Round Rock, TX (US)

(72) Inventors: Mark Andrew Schwager, Cedar Park, TX (US); Kai-Yuan Cheng, Taipei (TW)

(73) Assignee: Dell Products L.P., Round Rock, TX (US)

( * ) Notice: Subject to any disclaimer, the term of this patent is extended or adjusted under 35 U.S.C. 154(b) by 6 days.

(21) Appl. No.: 17/874,391

(22) Filed: Jul. 27, 2022

(65) Prior Publication Data

US 2024/0036618 A1 Feb. 1, 2024

(51) Int. Cl.
*G06F 1/16* (2006.01)

(52) U.S. Cl.
CPC .......... *G06F 1/1681* (2013.01); *G06F 1/1616* (2013.01)

(58) Field of Classification Search
CPC .............................. G06F 1/1681; G06F 1/1616
See application file for complete search history.

(56) References Cited

U.S. PATENT DOCUMENTS

| 2008/0034550 A1* | 2/2008 | Chang | G06F 1/1681 |
| | | | 16/367 |
| 2008/0232071 A1* | 9/2008 | Schechtel | H04M 1/0216 |
| | | | 361/755 |
| 2015/0277613 A1* | 10/2015 | Roberts | G06F 3/042 |
| | | | 345/175 |

FOREIGN PATENT DOCUMENTS

| CN | 201198866 Y | * | 2/2009 | ............. F16C 11/10 |
| CN | 202418225 U | * | 9/2012 | ............. F16C 11/04 |
| WO | WO-2021213054 A1 | * | 10/2021 | ............. G06F 1/16 |

* cited by examiner

*Primary Examiner* — Abhishek M Rathod
*Assistant Examiner* — Keon Kim
(74) *Attorney, Agent, or Firm* — Terrile, Cannatti & Chambers, LLP; Stephen A. Terrile (57) ABSTRACT

A hinge for a portable information handling system. The hinge includes a cylindrical shaft, the cylindrical shaft including an axially extending substantially flat section and a coil portion, the coil portion having a largely cylindrical interior edge, the largely cylindrical interior edge including a substantially flat section, the substantially flat section of the coil portion and the substantially flat section of the cylindrical shaft being aligned when a relative rotation of the hinge is between zero and five degrees.

12 Claims, 10 Drawing Sheets

PORTABLE INFORMATION HANDLING SYSTEM HINGE

BACKGROUND OF THE INVENTION

Field of the Invention

The present invention relates to information handling systems. More specifically, embodiments of the invention relate to a hinge for a portable information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment the invention relates to a hinge for a portable information handling system, comprising: a cylindrical shaft, the cylindrical shaft including an axially extending substantially flat section; and, a coil portion, the coil portion having a largely cylindrical interior edge, the largely cylindrical interior edge including a substantially flat section, the substantially flat section of the coil portion and the substantially flat section of the cylindrical shaft being aligned when a relative rotation of the hinge is between zero and five degrees.

In another embodiment the invention relates to an information handling system comprising: a processor; a data bus coupled to the processor; and an information handling system chassis housing, the housing comprising a base chassis; a display chassis; and, a hinge rotationally coupled between the base chassis and the display chassis, the hinge comprising a cylindrical shaft, the cylindrical shaft including an axially extending substantially flat section; and, a coil portion, the coil portion having a largely cylindrical interior edge, the largely cylindrical interior edge including a substantially flat section, the substantially flat section of the coil portion and the substantially flat section of the cylindrical shaft being aligned when a relative rotation of the hinge is between zero and five degrees.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Various aspects of the present disclosure include an appreciation that with certain known notebook type information handling systems, when the display chassis is rotated from an open mode of operation (e.g., 120 degree+/−20%) to a closed mode of operation, the entire chassis often bends. During the rotation by hand, when the front of the display chassis touches the front of the base chassis, the hinge angle often does not reach 0 degrees due to the chassis bending. With this condition, when pressure is no longer applied to the display chassis (e.g., the hand is released), the display chassis springs back a few degrees. With these systems, one solution to keep the system closed when the pressure is released, is to provide the system with a retention mechanism. For example in some systems, magnets are used to overcome the spring back or reverse cam design to force the hinge to zero degrees when the hinge angle is less than five degrees.

Various aspects of the present disclosure include an appreciation that certain known notebook type information handling systems use industry standard large diameter torque-release washer type hinges. These large diameter torque-release hinges use a reverse cam to force the hinge to 0 deg at low angles. However, this solution is not possible in a small diameter hinge. Accordingly, with certain known notebook type information handling systems, in effort to improve the industrial design, have been designed with a smaller diameter twin-coil type design. One advantage of such a smaller diameter twin-coil type design is an opening at the rear of the base chassis is closed (due to the smaller diameter of the hinge). However, the smaller diameter twin-coil type hinge design did not have a torque-release function. Without a torque-release function, magnets were needed at the front of the chassis to keep the system closed to overcome the spring back force.

With these known systems, the magnet strength was optimized such that the user could still open the product with one-hand without the base lifting. This design worked well when the system was on the table because the weight of the display assembly helped pull the display to zero degrees. However, when the system was in the vertical orientation (e.g., the back of the system was facing substantially downward), with the magnet force at the lower end of the tolerance range (to facilitate one-handed opening), the magnet force could not keep the display retained to the base. The tolerance ranges of the hinge torque and magnet strength were too large to make the solution perfect to meet both one-handed open and lid retention in vertical orientation.

Accordingly, a torque-release axial torsion hinge is disclosed. Such an torque-release axial torsion hinge provides a hinge solution with a reduction in hinge torque when the hinge angel is below 25 degrees. In certain embodiments, the torque-release axial torsion hinge includes a twin coil hinge design. In certain embodiments, a twin coil design with flat sections on the shaft and a corresponding flat on the twin coil sheet metal can provide a different torque profile as the hinge is rotated based on whether the flat sections are aligned or offset.

In certain embodiments, the hinge includes a hinge shaft, a coil portion and an overbend component. In certain embodiments, the coil portion includes a twin coil design. In certain embodiments, the coil portion is constructed from sheet metal. In certain embodiments, the overbend component includes a structural metal injection modeled (MIM) part for overbend protection. In certain embodiments, the hinge includes one or more riveted pins coupled between the coil portion and the overbend component.

In certain embodiments, the torque-release axial torsion hinge includes a torque release function. In certain embodiments, the torque release function is generated via a geometry interaction between the shaft and coil portion. In certain embodiments, the shaft and coil portion include respective flat sections. In certain embodiments, the torque release function is generated when the flat portions on the shaft and the coil portion are aligned. In certain embodiments, the range of motion of the display chassis is 135 degrees typical.

In certain embodiments, flat sections are added to the shaft and both sides of the coil (180 deg apart), such that the flat sections only interact when the display chassis is between zero degrees and five degrees relative to the base chassis. More specifically, at zero-five degrees, the flat sections on the shaft and coil are aligned. When the flat sections are aligned, the interference force between the shaft and the coil is lighter than all other angles. At greater than twenty five degrees, the flat sections on the shaft and coil are no longer aligned, causing a higher interference force, resulting in a larger constant torque. Between five and 25 degrees, the transition of the flat sections generates a different torque profile during open and closed modes of operation.

Such an torque-release axial torsion hinge advantageously eliminates a need for tight tolerance control, as well as for sorting hinges to assure they conform to the tight tolerances and for monitoring for the lid vertical issue in the factory. Additionally, such a torque-release axial torsion hinge provides a small diameter (e.g., less than 5 mm) hinge with a torque release function. There is no new manufacturing process needed for such a torque-release axial torsion hinge. In certain embodiments, the flat section is added to the shaft via a manufacturing process such as a computer numeric control (CNC) machining process.

Additionally, such a torque-release hinge enables torque release at low angles which thereby reduces or removes chassis spring back when the system is closed and the hand is removed. In certain embodiments, the torque relationships, T1, T2, T3, and T4, are selected and designed based on system weight and center of gravities of the base chassis and display chassis. In certain embodiments, the geometry interaction between the shaft and coil portion can be tailored to any torque profile at multiple angles by using flat sections of different coil axil lengths and at different angled positions.

Figure 1:
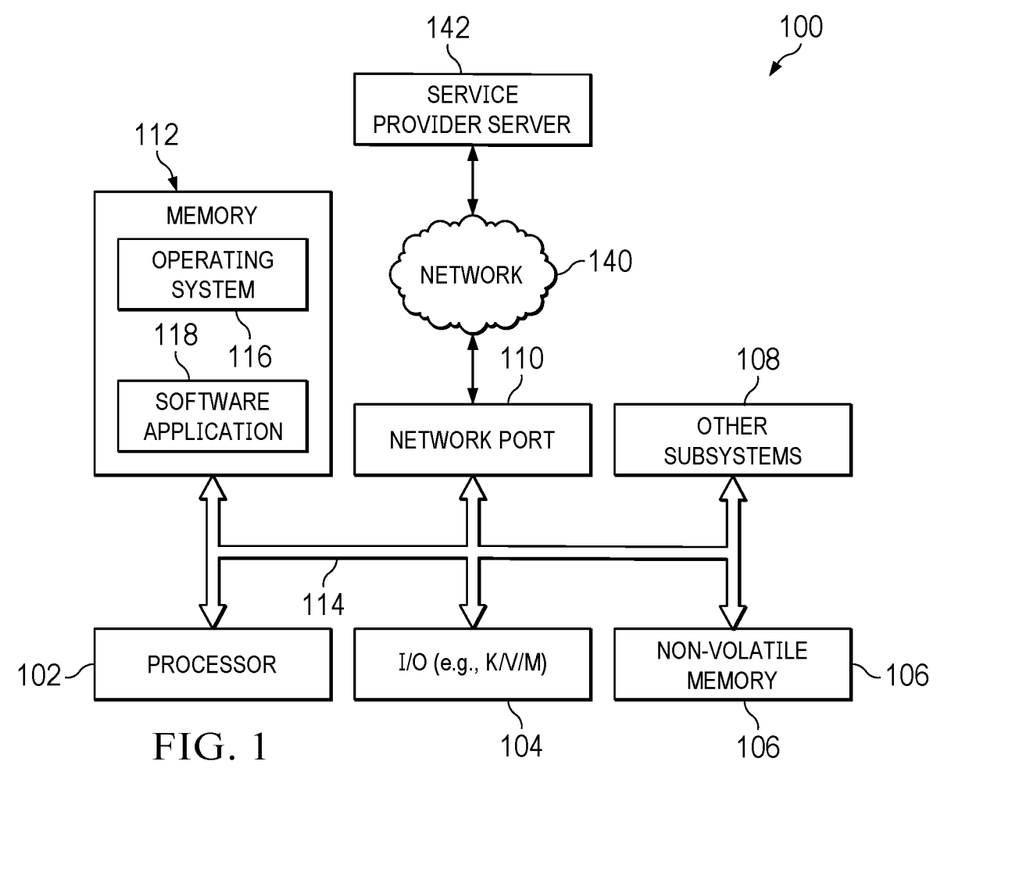
FIG. 1 shows a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, a touchpad or touchscreen, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise at least one software application 118. In one embodiment, the information handling system 100 is able to download the software application from the service provider server 142. In another embodiment, the software application 118 is provided as a service from the service provider server 142.

Figure 2:
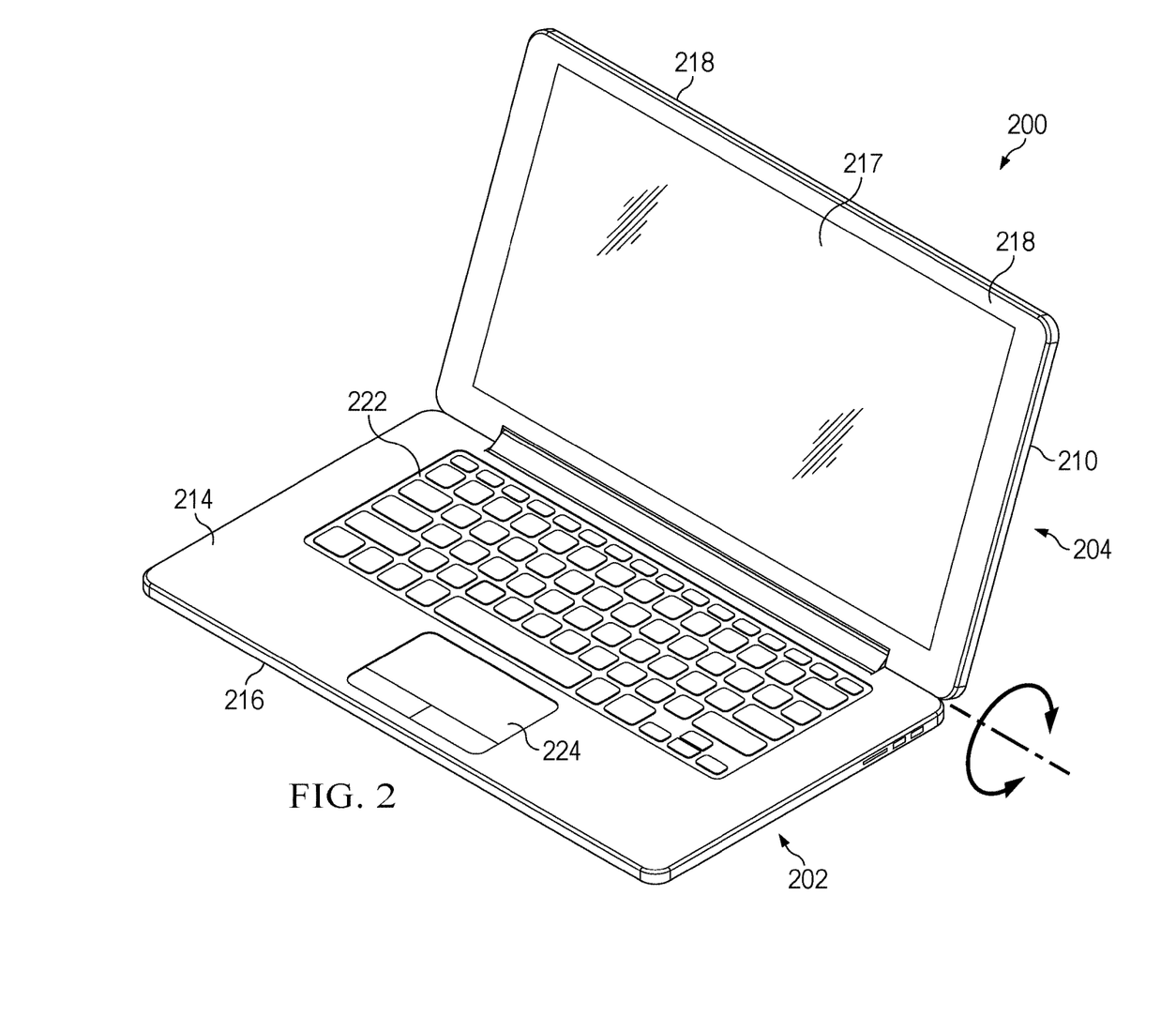
FIG. 2 shows a perspective view of an example portable information handling system.

FIG. 2 shows a perspective view of an example portable information handling system chassis 200 such as a tablet type portable information handling system, a laptop type portable information handling system, or any other mobile information handling system. It will be appreciated that some or all of the components of the information handling system 100 may be included within information handling system chassis 200. The portable information handling system 200 chassis includes a base chassis 202 and a display chassis 204 shown in an open configuration. It will be appreciated that a closed configuration would have the display chassis 204 fully closed onto the base chassis 202.

The base chassis 202 or the display chassis 204 of the information handling system 200 may comprise an outer metal case or shell. The information handling system 200 may include a plurality of chassis portions. In various embodiments, the information handling system 200 may include some or all of an A-Cover 210, a B-Cover 212, a C-cover 214 and a D-Cover 216. In various embodiments, the A-Cover 210 and the B-Cover 212 provide the display chassis 204. In various embodiments, the C-Cover 214 and the D-Cover 216 provide the base chassis 202.

In various embodiments, the A-cover 210 encloses a portion of the display chassis 204 of the information handling system 200. In various embodiments, the B-cover 212 encloses another portion of the display chassis 204 of the information handling system 200. In various embodiments, the B-Cover may include a display screen 217 and a bezel 218 around the display screen.

In various embodiments, the C-cover 214 encloses a portion of the base chassis 202 of the information handling system 200. In various embodiments, the C-cover 214 may include, for example, a keyboard 222, a trackpad 224, or other input/output (I/O) device. In various embodiments, certain components of the information handling system such as a mother board are mounted within the C-Cover 214. In various embodiments, the D-cover 216 encloses another portion of the base chassis 202 of the information handling system 200.

When placed in the closed configuration, the A-cover 210 forms a top outer protective shell, or a portion of a lid, for the information handling system 200, while the D-cover 216 forms a bottom outer protective shell, or a portion of a base, for the information handling system. When in the fully closed configuration, the A-cover 210 and the D-cover 216 would be substantially parallel to one another.

In some embodiments, both the A-cover 210 and the D-cover 216 may be comprised entirely of metal. In some embodiments, the A-cover 210 and D-cover 216 may include both metallic and plastic components. For example, plastic components that are radio-frequency (RF) transparent may be used to form a portion of the C-cover 214.

In various embodiments, the display chassis 204 may be movably connected to a back edge of the base chassis 202 via one or more hinges. In this configuration, the hinges allow the display chassis 204 to rotate from and to the base chassis 202 allowing for multiple orientations of the information handling system 200. In some embodiments, the information handling system may be a laptop with limited rotation of the display chassis 2040 with regard to the base chassis 202, for example up to 140° rotation arc (+/−25%). In other embodiments the information handling system 200 may be a convertible information handling system with full rotation to a tablet configuration.

Figure 3:
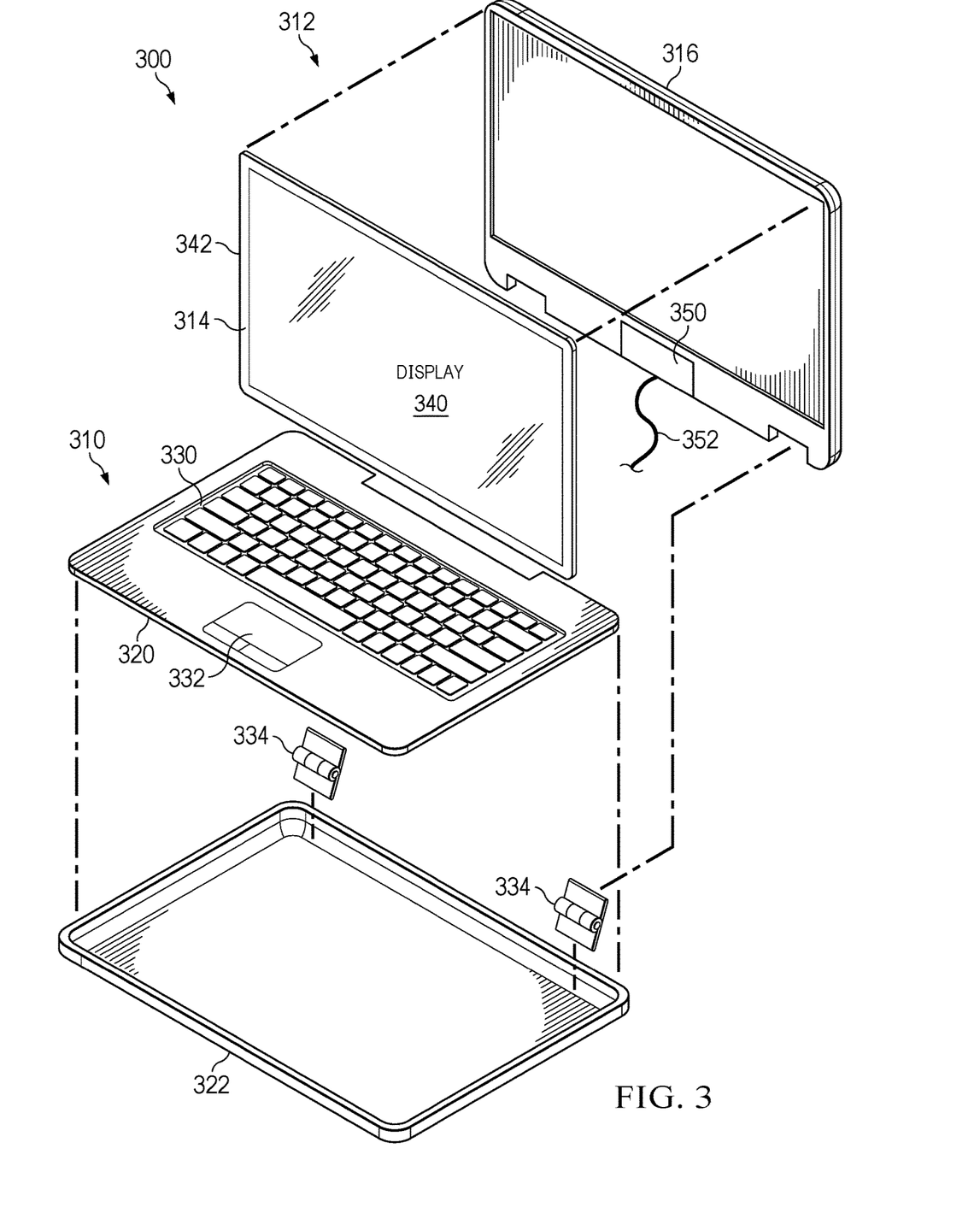
FIG. 3 shows a blown-up view of a portable information handling system.

FIG. 3 shows a blown-up view of a portable information handling system 300 having rotationally-coupled housing portions. In the example embodiment, a main housing portion 310 (which corresponds to a base chassis 202) rotationally couples to a lid housing portion 312 (which corresponds to a display chassis 204) to support various configurations to interact with an end user. Main housing portion 310 may hold one or more components of the portable information handling system, including but not limited to processor 102, system bus 114, memory subsystem 112, I/O subsystem 104 and network interface 110 discussed with respect to FIG. 1. Main housing portion 310 includes a top cover portion 320 (which includes the C-Cover 214) and a bottom cover portion 322 (which includes the D-Cover 216). Lid housing portion 312 includes a display cover portion 314 (which includes the B-Cover 210) and a rear display cover portion 316 (which includes the A-Cover 212). The top cover portion 320 may include an integrated keyboard 330 or other I/O devices, such as a trackpad 332 or microphone (not shown). In various embodiments, the keyboard 330 may be mounted to the top of the C-Cover of the main housing portion 310. In various embodiments, the keyboard 330 may be mounted to the underside of the C-Cover of the main housing portion 310.

Lid housing portion 312 is rotationally coupled to main housing portion 310 via at least one hinge assembly 334. Lid housing portion 312 includes display 340 that visually presents information to the user as well as a bezel 342. Display 340 may be a touch panel with circuitry enabling touch functionality in conjunction with a display. In some embodiments, display 340 may be an "infinity edge" or "narrow bezel" display that approaches one or more the edges of lid housing portion 212 such that bezel may be narrow in size (e. g., less than 10 millimeters) on the edges. For example, display 340 is an infinity display with narrow bezels on the top and sides of lid housing portion 212 in the embodiment shown in FIG. 3. In certain embodiments, the side bezel is less than 4 mm (+/−10%) and the top bezel is less than 6 mm (+/−10%).

Lid housing portion 312 may also include timing controller (TCON) 350. Hinge assembly 330 may include cable 352 for communicably coupling one or more components within main housing portion 310 to one or more components within lid housing portion 312. For example, cable 352 may provide communication of graphics information from an I/O subsystem to TCON 350 for generation of visual images for display on display 340. Although a single cable 352 is shown, portable information handling system 300 may include one or more additional cables 352 for communicating components disposed in main housing portion 310 and lid housing portion 312. Placement of cable 352 may be selected based on design considerations, materials or manufacturing cost, material reliability, antenna placement, as well as any other considerations.

Hinge assembly 334 allows main housing portion 310 and lid housing portion 312 to rotate between a plurality of positions. For example, when portable information handling system 300 is not in use, lid housing portion 312 may be closed over the top of main portion 310 such that display 340 and keyboard 330 are protected from unintended use or damage. Rotation of lid housing portion 312 by approximately 90 degrees from main housing portion 310 brings display 340 in a raised "clamshell" position relative to keyboard 330 so that an end user can make inputs to keyboard 330 or touch panel portion of display 340 while viewing display 340. In some embodiments, clamshell position may represent lid housing portion 312 open between approximately 1 and 180 degrees from main housing portion 310. Rotation of lid housing portion 312 between approximately 180 and 359 degrees from main housing portion 310 may place portable information handling system 300 in "tablet stand" and/or "tent" positions. In tablet stand and tent positions, the user may make inputs via touch panel portion of display 340 while viewing display 340. A full 360 degree rotation of main housing portion 310 relative to lid housing portion 312 provides a tablet configuration having display 340 exposed to accept touch inputs. In any position, user inputs may be communicated to an I/O subsystem or a processor of the portable information handling system 300 for processing, and then updated information may be communicated back via cable 352 to display 340 for displaying to the user. Hinge assembly 334 may be comprised of one or more discrete hinges or a unified assembly of hinges.

In certain embodiments, one or both of hinge assemblies 334 include an torque-release axial torsion spring. In certain embodiments, one or both hinge assemblies 334 include a twin coil torque-release axial torsion spring.

Figure 4:
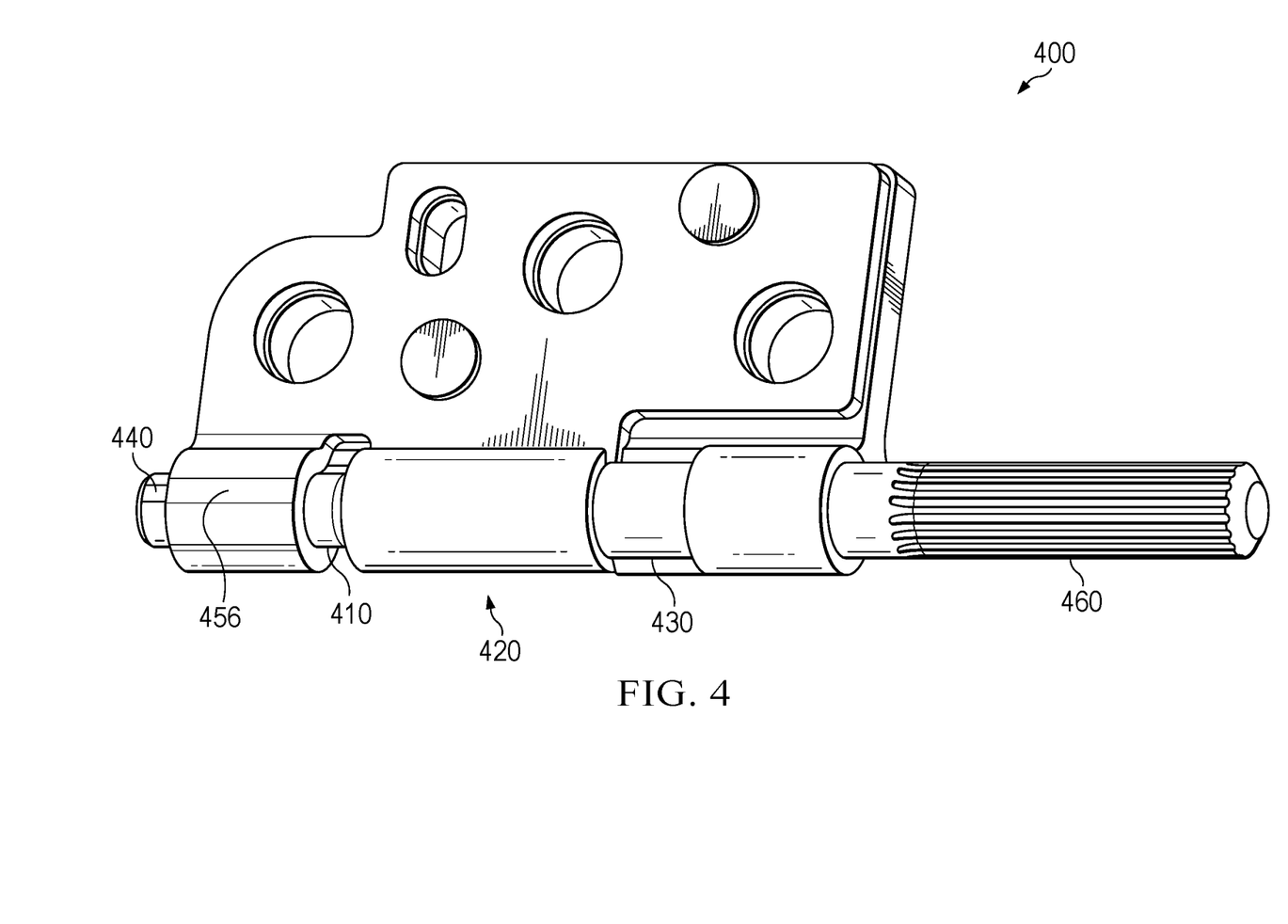
FIG. 4 shows a perspective view of a portion of a torque-release axial torsion hinge.

FIG. 4 shows a perspective view of a portion of a torque-release axial torsion hinge 400. In certain embodiments, the torque-release axial torsion hinge 400 provides a torque release hinge solution. In certain embodiments, the torque-release axial torsion hinge 400 includes a twin coil hinge design. In certain embodiments, a twin coil design with flat section on the shaft and a corresponding flat on the twin coil sheet metal can provide a different torque profile as the hinge is rotated based on whether the flats are aligned or offset.

In certain embodiments, the hinge 400 includes a hinge shaft 410, a coil portion 420 and an overbend component 430. In certain embodiments, the coil portion 420 includes a twin coil design. In certain embodiments, the overbend component prevents the hinge from rotating beyond substantially (e.g., +/−20%) 140 degrees of relative rotation (i.e., the display chassis is no more than 140 degrees relative to the base chassis). In certain embodiments, the coil portion is constructed from sheet metal. In certain embodiments, the overbend component 430 includes a structural metal injection modeled (MIM) part for overbend protection.

In certain embodiments, the torque-release axial torsion hinge includes a torque release function. In certain embodiments, the torque release function is generated via a geometry interaction between the shaft 410 and coil portion 420. In certain embodiments, the shaft 410 and coil portion 420 include respective flat sections 440, 450. In certain embodiments, the torque release function is generated when the flat portion on the shaft 440 and flat portion on the coil portion 450 are aligned. In certain embodiments, the range of motion of the display chassis is 135 degrees (+/−20%) typical. In certain embodiments, the shaft 410 includes an attachment portion 460. In certain embodiments, the attachment portion 460 attaches to a D-cover of a base chassis of an information handling system.

In certain embodiments, the shaft 410 includes flat section to both sides of the shaft (180 degrees apart) and the coil, such that the flat sections only interact when the display chassis is between zero degrees and five degrees relative to the base chassis. More specifically, at zero-five degrees, the flat sections on the shaft and coil are aligned. When the flat sections are aligned, the interference force between the shaft and the coil is lighter than all other angles. At greater than twenty five degrees, the flat sections on the shaft and coil are no longer aligned, causing a higher interference force, resulting in a larger constant torque. Between five and twenty five degrees, the transition of the flat sections generates a different torque profile during open and closed modes of operation.

Such an torque-release axial torsion hinge 400 advantageously eliminates a need for tight tolerance control such as by binning or scrapping hinges), as well as for sorting hinges to assure they conform to the tight tolerances and for monitoring for the lid vertical issue in the factory. Additionally, such a torque-release axial torsion hinge 400 provides a small diameter (e.g., less than 5 mm) hinge with a torque release function. There is no new manufacturing process needed for such a torque-release axial torsion hinge. In certain embodiments, the flat section is added to the shaft via a manufacturing process such as a computer numeric control (CNC) machining process. In certain embodiments, the hinge includes one or more riveted pins 460 coupled between the coil portion and the overbend component.

Figure 5:
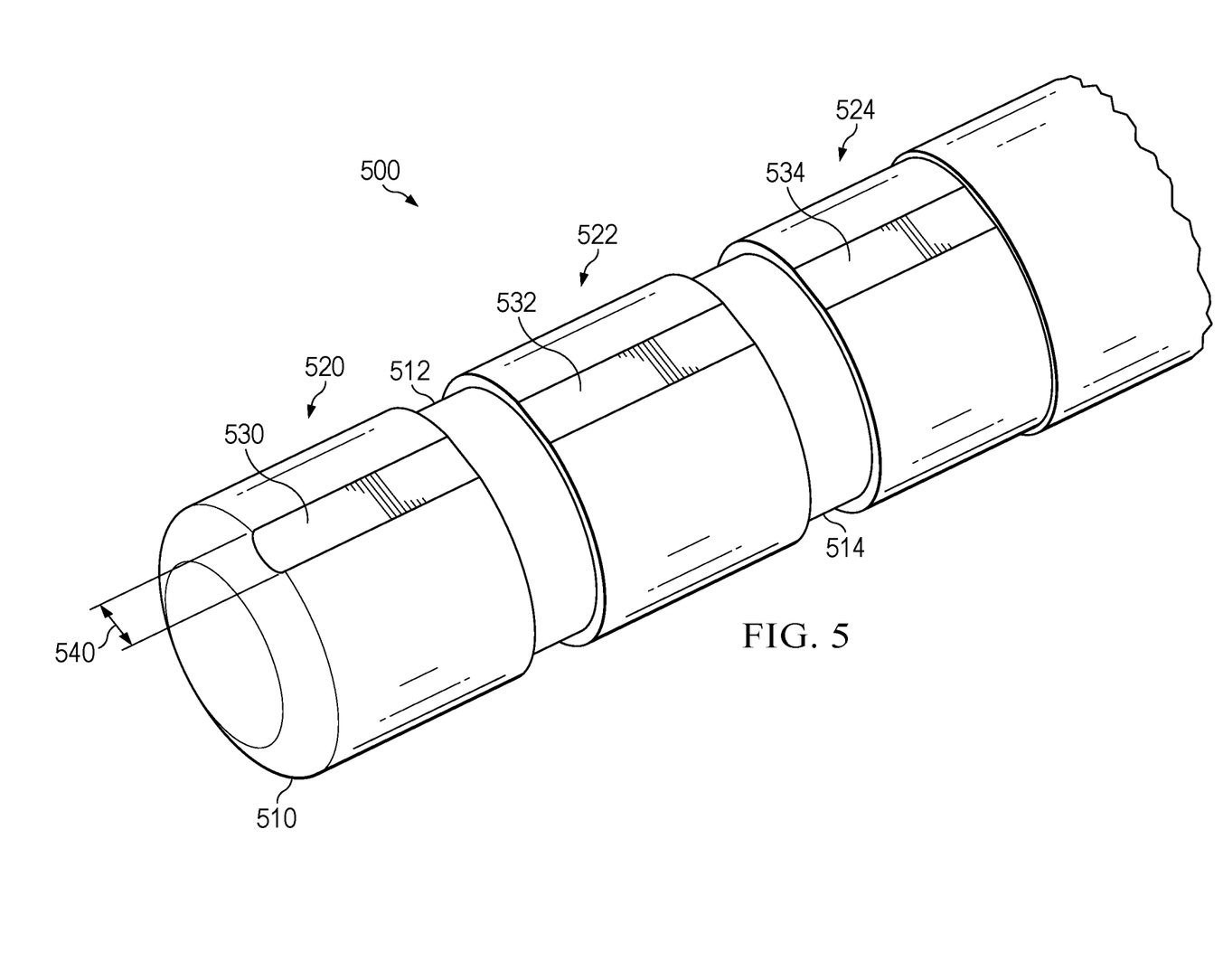
FIG. 5 shows a perspective view of a shaft of a torque-release axial torsion hinge.
Figure 6:
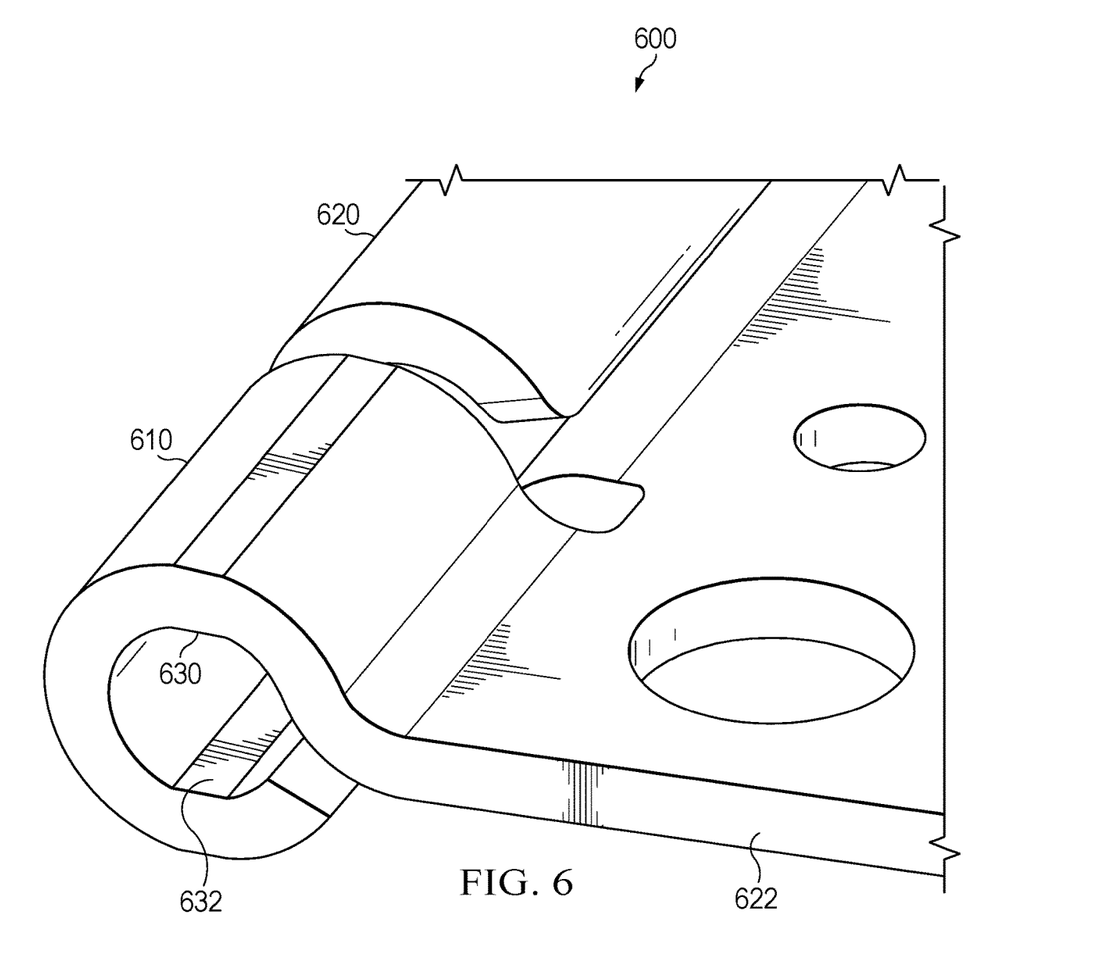
FIG. 6 shows a perspective view of a coil of a torque-release axial torsion hinge.
Figure 7:
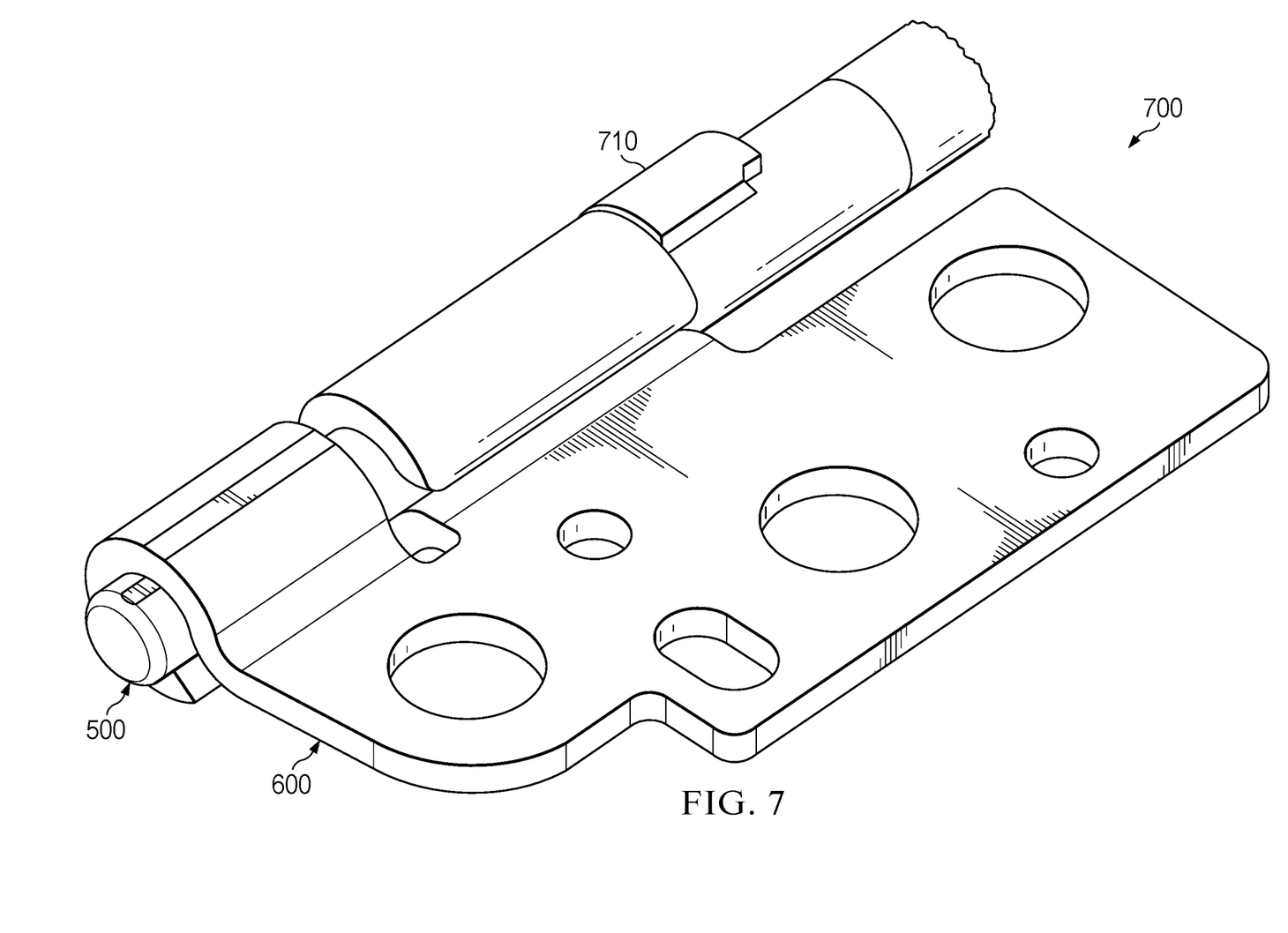
FIG. 7 shows a perspective view of a torque-release twin coil axial torsion hinge.

FIG. 5 shows a perspective view of a shaft 500 of a torque-release axial torsion hinge. In certain embodiments, the shaft 500 corresponds to the shaft 410. FIG. 6 shows a perspective view of a coil portion 600 of a torque-release axial torsion hinge. In certain embodiments, the coil 600 corresponds to coil portion 420. FIG. 7 shows a perspective view of a torque-release twin coil axial torsion hinge 700. In certain embodiments, the torque-release twin coil axial torsion hinge 700 corresponds to torque-release axial torsion hinge 400.

In certain embodiments, the shaft 500 is cylindrical, with a largely circular (e.g., +/−10%) cross section 510. In certain embodiments, the shaft 500 include a plurality of indented portions 512, 514 with largely circular (e.g., +/−10%) cross sections. In certain embodiments, the cross sectional diameter of the indented portions 512, 514 is smaller than the cross sectional diameter of the remainder of the shaft 500. In certain embodiments, the indented portions 512, 514 delineate a plurality of axial portions 520, 522, 524 of the shaft 500.

In certain embodiments, some or all of axial portions 520, 522, 524 include respective substantially flat sections 530, 532, 534. In certain embodiments, some of all of the flat sections 530, 532, 534 extend axially across some or all of the shaft 500. In certain embodiments, only one of the axial portions 520, 522, 524 includes a respective flat section. In certain embodiments, the width 540 of the flat sections is selected to generate a desired torque profile based upon the interaction of the flat section with a corresponding portion of a coil of the hinge. In certain embodiments, the width of the flat sections roughly correspond (e.g., by +/−25%) to a percentage of the radius of the cross section of the shaft 500. In certain embodiments, the width of the flat sections corresponds to substantially 25% (+/−15%) of the radius of the cross section of the shaft 500. In certain embodiments, the width of the flat sections 530, 532 534 is substantially the same. In certain embodiments, one or more of the flat sections may have different widths. In certain embodiments, the shaft can include flat sections on both a "top" of the shaft and a "bottom" of a shaft such that the flat sections are substantially 180 degrees removed alone the cross section of the shaft 500.

In certain embodiments, the cross section of the interior edge of the coil is largely circular (e.g., +/−10%). In certain embodiments, the diameter of the interior edge of the coil is slightly smaller (e.g., +/−5%) than the diameter of the shaft 500. In certain embodiments, the difference in the diameters causes an application of torque as the coil is rotated about the axis if the shaft.

In certain embodiments, the coil portion 600 includes a coil 610 and a coil 620 and a mounting portion 622 coupled to the coil 610 and the coil 620. In certain embodiments, the mounting portion 622 and one or both the coil 610 and the coil 620 are constructed from a single material. In certain embodiments, the mounting portion 622 and one or both the coil 610 and the coil 620 are constructed from a single piece of sheet metal.

In certain embodiments, the coil 610 and the coil 620 are positioned in counter rotating orientations. In certain embodiments, the coil 610 is wrapped in one of a counter clockwise direction and a clockwise direction about an axis of the coil portion 600. In certain embodiments, the coil 620 is wrapped in another of a clockwise direction and a counter clockwise direction about an axis of the coil portion 600. In certain embodiments, the coil 610 and the coil 620 provide the coil portion 600 with a twin coil design.

In certain embodiments, the coil 610 includes one or more interior flat sections 630, 632. In certain embodiments, the width of the one or more interior flat sections 630, 632 correspond to the width of a flat section of the shaft 500. In certain embodiments, the coil can include flat sections on both a "top" of the coil and a "bottom" of the coil such that the flat sections are substantially 180 degrees removed alone the cross section of the interior of the coil 610.

In certain embodiments, the shaft 500 includes flat sections to both sides of the shaft (180 degrees apart) and the coil, such that the flat sections only interact when the display chassis is between zero degrees and five degrees relative to the base chassis. More specifically, at zero-five degrees, the flat sections on the shaft and coil are aligned. When the flat sections are aligned, the interference force between the shaft and the coil is lighter than all other angles. At greater than twenty five degrees, the flat sections on the shaft and coil are no longer aligned, causing a higher interference force, resulting in a larger constant torque. Between five and twenty five degrees, the transition of the flat sections generates a different torque profile during open and closed modes of operation.

In certain embodiments, the hinge 700 includes an overbend component 710. In certain embodiments, the overbend component 710 corresponds to overbend component 430. In certain embodiments, the overbend component 710 includes a structural metal injection modeled (MIM) part for overbend protection.

Figure 8:
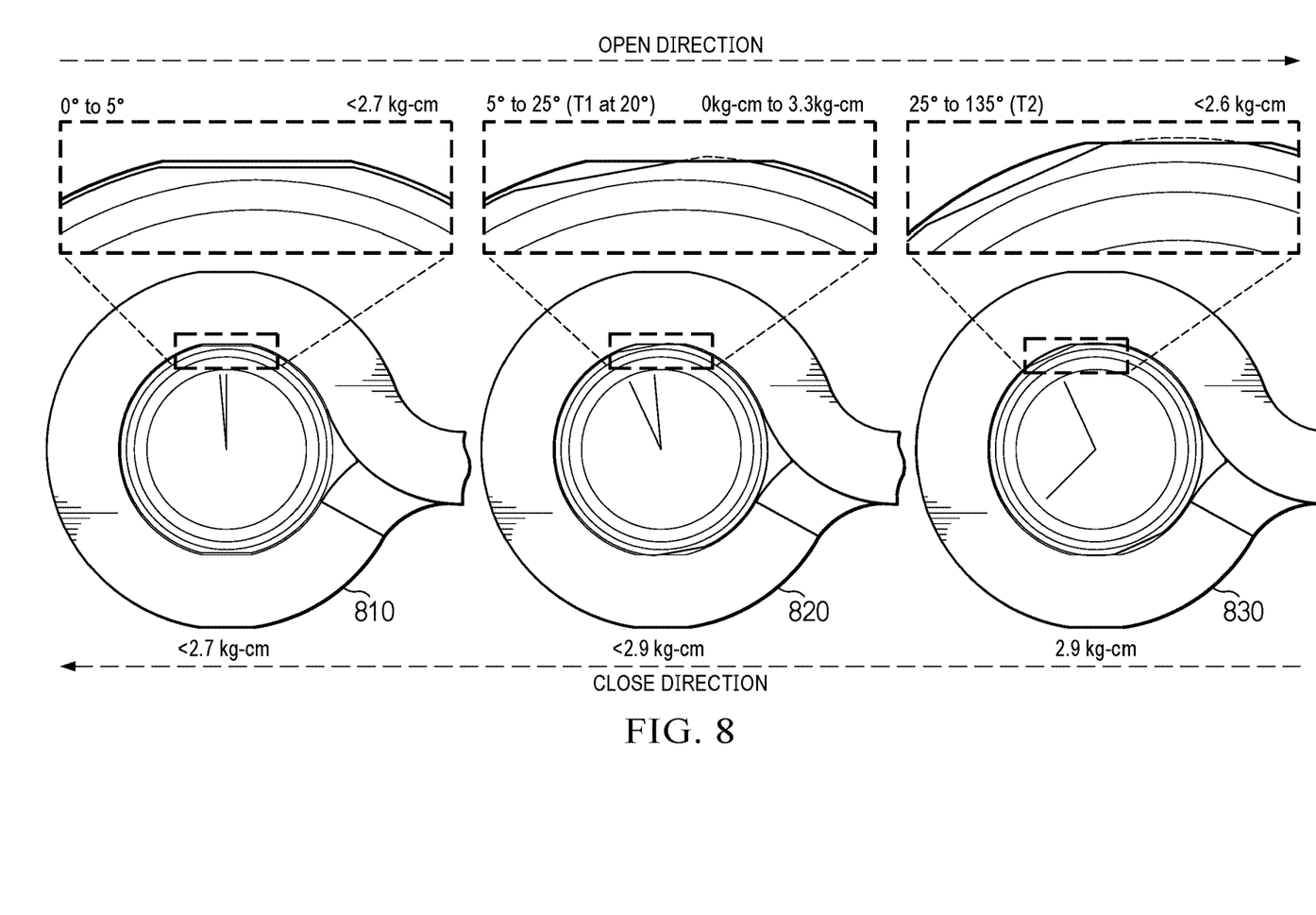
FIG. 8 shows side views of a torque-release axial torsion hinge at different angels of hinge rotation.
Figure 9A:
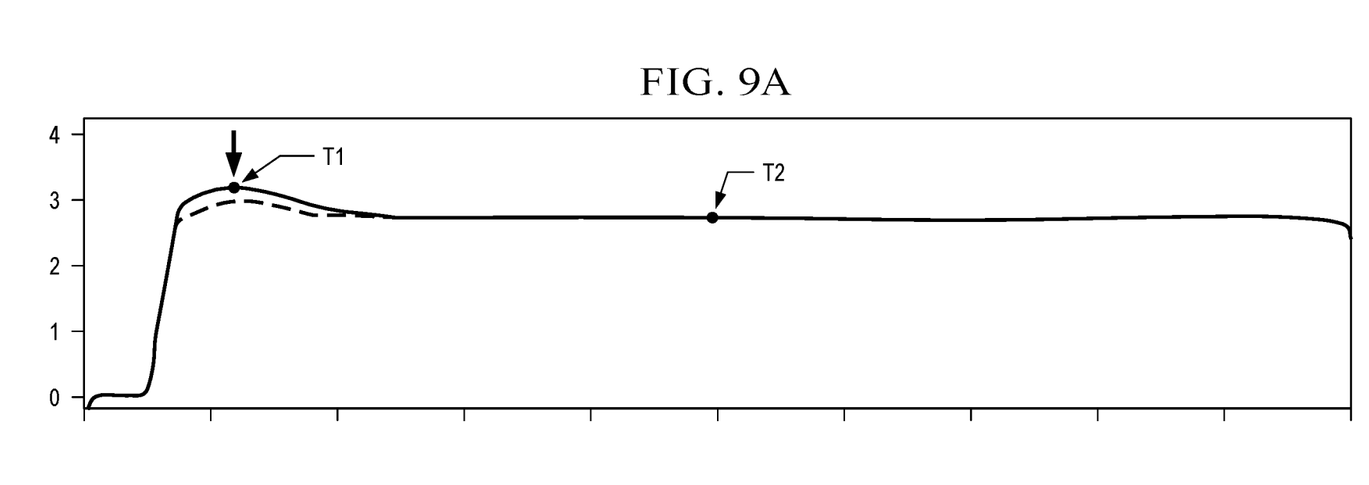
FIGS. 9A and 9B show example torsion results as a coil of a torque-release axial torsion hinge is rotated about its shaft.
Figure 9B:
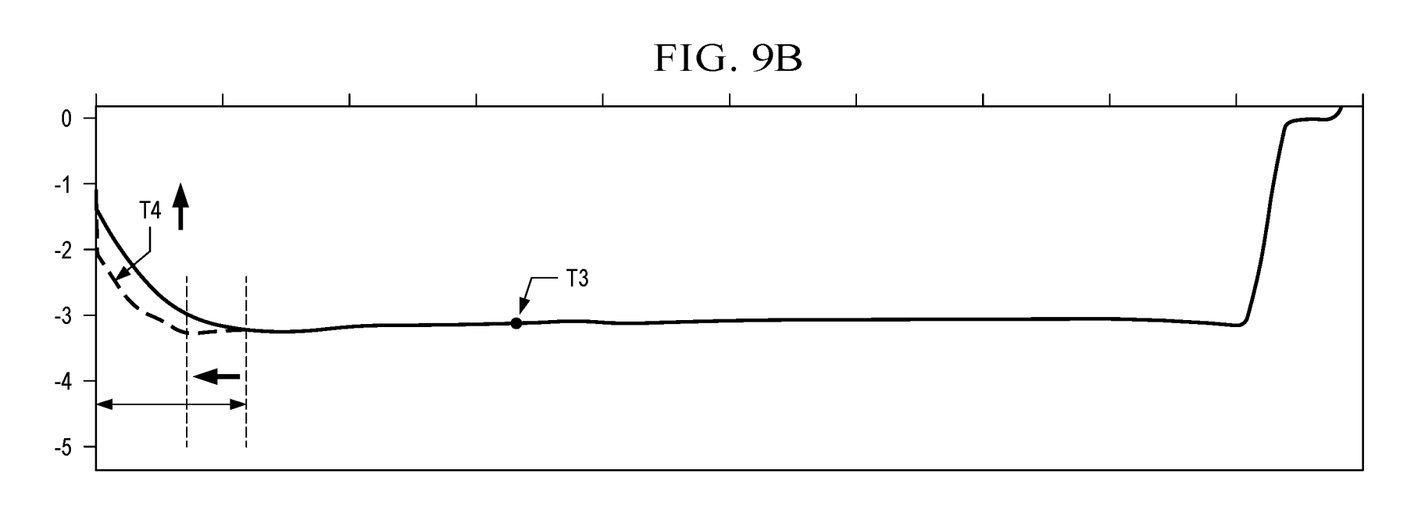

FIG. 8 shows side views of a torque-release axial torsion hinge at different angels of hinge rotation. FIG. 9A shows example torsion results as a torque-release axial torsion hinge is opened from an angle of 0 degrees to an angle of 135 degrees. FIG. 9B show example torsion results as a torque-release axial torsion hinge is closed from an angle of 135 degrees to an angle of 0 degrees.

More specifically, at zero-five degrees, the flat sections on the shaft and coil are aligned (see e.g., 810). When the flat sections are aligned, the interference force between the shaft and the coil is lighter than all other angles. At greater than twenty five degrees, the flat sections on the shaft and coil are no longer aligned, causing a higher interference force, resulting in a larger constant torque (see e.g., 830). Between five and twenty five degrees, the transition of the flat sections generates a different torque profile during open and closed modes of operation (see e.g., 820).

Additionally, such a torque-release hinge enables torque release at low angles which thereby reduces or removes the chassis spring back during hinge rotation when the hinge is closed. In certain embodiments, the torque, T1, T2, T3, and T4, are selected and designed based on system weight and center of gravities of the base chassis and display chassis. In certain embodiments torque values T1 and T2 correspond to open torque values and torque values T3 and T4 correspond to close torque values. For example, for one particular information handling system, the torque values T1 and T2 correspond to 3.3 kgf-cm (Peak) and 2.6 kgf-cm+/−0.3, respectively, and the torque values T3 and T4 correspond to 2.9+/−0.4 kgf-cm and 2.7 kgf-cm (Max), respectively.

In certain embodiments, the geometry interaction between the shaft and coil portion can be tailored to any torque profile at multiple angles by using flat sections of different coil axil lengths and at different angled positions.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A hinge for a portable information handling system, comprising:
   a cylindrical shaft, the cylindrical shaft including an axially extending substantially flat section, the axially extending substantially flat section extending along a top portion of the cylindrical shaft when the portable information handling system is in a closed orientation; and,
   a coil portion, the coil portion having a largely cylindrical interior edge, the largely cylindrical interior edge including a substantially flat section, the substantially flat section of the coil portion extending along a top portion of the coil portion, the substantially flat section of the coil portion and the substantially flat section of the cylindrical shaft being aligned when a relative rotation of the hinge is between zero and five degrees; and wherein
   interaction between the substantially flat section of the cylindrical shaft and the substantially flat section of the coil portion provide a torque-release function, the torque-release function being generated via a geometry interaction between the substantially flat section of the cylindrical shaft and the substantially flat section of the coil portion; and wherein
   the cylindrical shaft includes axially extending substantially flat sections along both sides of the shaft;
   at zero to five degrees, the substantially flat sections on the cylindrical shaft and relative substantially flat sections of the coil portion are aligned, at greater than twenty five degrees, the substantially flat sections on the cylindrical shaft and relative substantially flat sections of the coil portion are no longer aligned and between five and twenty five degrees, transition of the substantially flat sections on the cylindrical shaft and the relative substantially flat sections of the coil portion generate different torque profiles during open and closed modes of operation.

2. The hinge of claim 1, further comprising:
   an overbend component, the overbend component preventing the hinge from rotating beyond substantially 140 degrees of relative rotation.

3. The hinge of claim 1, wherein:
   the coil portion includes a first coil, the first coil being wrapped in one of a counter clockwise direction and a clockwise direction about an axis of the coil portion.

4. The hinge of claim 3, wherein:
   the coil portion includes a second coil, the second coil being wrapped in another of a counter clockwise direction and a clockwise direction about an axis of the coil portion.

5. The hinge of claim 4, wherein:
   the first coil and the second coil are positioned in counter rotating orientations.

6. The hinge of claim 1, wherein:
   the torque applied by the hinge as the hinge is rotated is small enough to allow single handed opening of the portable information handling system.

7. An information handling system comprising:
   a processor;
   a data bus coupled to the processor; and
   an information handling system chassis housing, the housing comprising a base chassis;

a display chassis; and, a hinge rotationally coupled between the base chassis and the display chassis, the hinge comprising a cylindrical shaft, the shaft including an axially extending substantially flat section, the axially extending substantially flat section extending along a top portion of the cylindrical shaft when the information handling system is in a closed orientation; and, a coil portion, the coil portion having a largely cylindrical interior edge, the largely cylindrical interior edge including a substantially flat section, the substantially flat section of the coil portion extending along a top portion of the coil portion, the substantially flat section of the coil portion and the substantially flat section of the cylindrical shaft being aligned when a relative rotation of the hinge is between zero and five degrees; and wherein interaction between the substantially flat section of the cylindrical shaft and the substantially flat section of the coil portion provide a torque-release function, the torque-release function being generated via a geometry interaction between the substantially flat section of the cylindrical shaft and the substantially flat section of the coil portion; and wherein the cylindrical shaft includes axially extending substantially flat sections along both sides of the shaft;

at zero to five degrees, the substantially flat sections on the cylindrical shaft and relative substantially flat sections of the coil portion are aligned, at greater than twenty five degrees, the substantially flat sections on the cylindrical shaft and relative substantially flat sections of the coil portion are no longer aligned and between five and twenty five degrees, transition of the substantially flat sections on the cylindrical shaft and the relative substantially flat sections of the coil portion generate different torque profiles during open and closed modes of operation.

8. The information handling system of claim 7, wherein the hinge further comprises:

an overbend component, the overbend component preventing the hinge from rotating beyond substantially 140 degrees of relative rotation.

9. The information handling system of claim 7, wherein:

the coil portion includes a first coil, the first coil being wrapped in one of a counter clockwise direction and a clockwise direction about and axis of the coil portion.

10. The information handling system of claim 9, wherein:

the coil portion includes a second coil, the second coil being wrapped in one of a counter clockwise direction and a clockwise direction about and axis of the coil portion.

11. The information handling system of claim 10, wherein:

the first coil and the second coil are positioned in counter rotating orientations.

12. The information handling system of claim 7, wherein:

the torque applied by the hinge as the hinge is rotated is small enough to allow single handed opening of the portable information handling system.

* * * * *